(12) United States Patent
Huster et al.

(10) Patent No.: US 9,843,698 B2
(45) Date of Patent: Dec. 12, 2017

(54) METHOD AND SYSTEM FOR PERFORMING A PRINT PROCESS USING A MAP

(71) Applicant: CANON EUROPA N.V., Amstelveen (NL)

(72) Inventors: Karsten Huster, Amstelveen (NL); Peter Lange, Amstelveen (NL); Michael Rosemann, Amstelveen (NL)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 15/300,706

(22) PCT Filed: Mar. 27, 2015

(86) PCT No.: PCT/EP2015/056801
§ 371 (c)(1),
(2) Date: Sep. 29, 2016

(87) PCT Pub. No.: WO2015/150289
PCT Pub. Date: Oct. 8, 2015

(65) Prior Publication Data
US 2017/0111542 A1    Apr. 20, 2017

Related U.S. Application Data

(60) Provisional application No. 61/974,295, filed on Apr. 2, 2014.

(51) Int. Cl.
*G06F 15/00* (2006.01)
*G06F 3/12* (2006.01)
(Continued)

(52) U.S. Cl.
CPC ..... *H04N 1/32101* (2013.01); *H04N 1/00233* (2013.01); *H04N 1/00344* (2013.01);
(Continued)

(58) Field of Classification Search
CPC ........... H04N 1/32101; H04N 1/00233; H04N 1/00344; H04N 2201/0094; H04N 2201/3205; H04N 2201/3208
(Continued)

(56) References Cited

U.S. PATENT DOCUMENTS

2005/0021703 A1    1/2005  Cherry
2011/0228322 A1*   9/2011  Ashikawa ............. G01C 21/32
                                                 358/1.15
(Continued)

FOREIGN PATENT DOCUMENTS

EP           2495935 A1    9/2012

*Primary Examiner* — Douglas Tran
(74) *Attorney, Agent, or Firm* — Canon U.S.A., Inc. IP Division (57) ABSTRACT

A print system made up of networked devices, which include a management server, a client, and a printer. The client provides attribute information, indicating at least one attribute of the client, and capability information, indicating a capability of the client, to the management server. The management server uses the capability and attribute information provided by the client to generate a map indicating, for each of a plurality of services forming part of a print process, address information of at least one networked device capable of performing the service. The management server provides the map to the client. The client uses the address information of the map in the performance of the print process.

16 Claims, 6 Drawing Sheets

(51) Int. Cl.
*G06K 1/00* (2006.01)
*H04N 1/32* (2006.01)
*H04N 1/00* (2006.01)

(52) U.S. Cl.
CPC ............... *H04N 2201/0094* (2013.01); *H04N 2201/3205* (2013.01); *H04N 2201/3208* (2013.01)

(58) Field of Classification Search
USPC .............................. 358/1.15, 1.1, 1.13, 1.14
See application file for complete search history.

(56) References Cited

U.S. PATENT DOCUMENTS

| | | |
|---|---|---|
| 2012/0062912 A1 | 3/2012 | St Jacques, Jr. |
| 2013/0194626 A1* | 8/2013 | Sakurai ................ G06F 3/1296 358/1.15 |
| 2014/0287779 A1* | 9/2014 | O'Keefe ................ H04W 4/02 455/456.3 |
| 2015/0199156 A1* | 7/2015 | Jang ..................... G06F 3/1232 358/1.15 |

\* cited by examiner

METHOD AND SYSTEM FOR PERFORMING A PRINT PROCESS USING A MAP

CROSS-REFERENCE TO RELATED APPLICATION

The present application was filed as PCT application number PCT/EP2015/056801 filed on 27 Mar. 2015 and claims priority from U.S. provisional patent application No. 61/974,295 filed on 2 Apr. 2014, each of which is incorporated by reference.

BACKGROUND OF THE INVENTION

Technical Field

The present invention relates to a print system, management server, client, method of operating a print system, method of operating a management server and method of operating a client.

Description of Related Art

Figure 1:
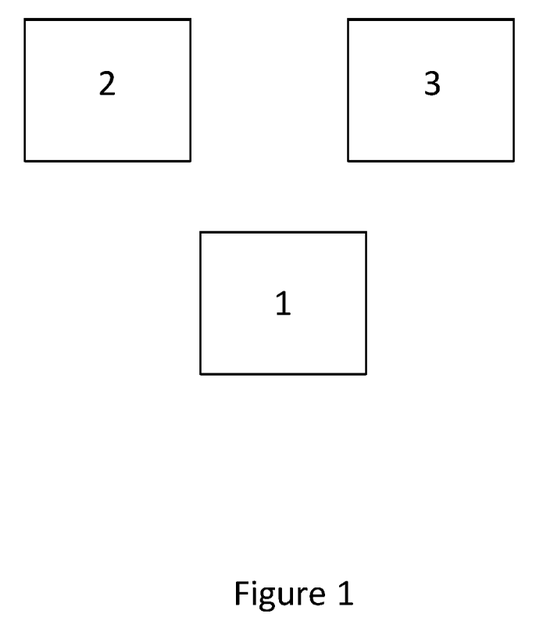
FIG. 1 shows a known print system arrangement.

FIG. 1 shows a known networked print system for performing a print process, the print system comprising a print server 1, a client 2 and a print apparatus 3 in the form of a multi-function peripheral (MFP). In an example of a secure print process, a user instructs printing of a document, e.g. from a word-processing application, at the client 2. The print job is transmitted to the print server 3 where it is stored on a secure print queue. The user authenticates him/herself at the print apparatus 3 e.g. using a card or username and password. The user authentication information is transmitted from the print apparatus 3 to the print server 1. The print server after processing the authentication information sends, to the print apparatus, print job information about print jobs belonging to the user to whom the card/username and password belongs. The user selects a print job at the print apparatus from the print job information, the print apparatus transmits the print request for the selected print job to the print server. The print server processes the print job in accordance with the identity of the print apparatus, if necessary, and sends the processed print job to the print apparatus for printing.

SUMMARY OF THE INVENTION

The embodiments of the invention provide a flexible and resilient configuration, for performing services forming at least part of a print process, which can reduce network traffic and server usage.

According to an aspect of the present invention, a print system made up of networked devices includes a management server as a networked device, a client as a networked device, and a printer as a networked device, wherein the client is configured to provide attribute information, indicating at least one attribute of the client, and capability information, indicating a capability of the client, to the management server, wherein the management server is configured to use the capability and attribute information provided by the client to generate a map indicating, for each of a plurality of services forming part of a print process, address information of at least one networked device capable of performing the service, wherein the management server is configured to provide the map to the client, and wherein the client is configured to use the address information of the map in the performance of the print process.

The present invention provides a print system as set out in claim 1. Further aspects of the invention are claimed in the independent claims.

DESCRIPTION OF THE EMBODIMENTS

Embodiments of the invention will now be described with reference to the accompanying exemplary figures.

Figure 2:
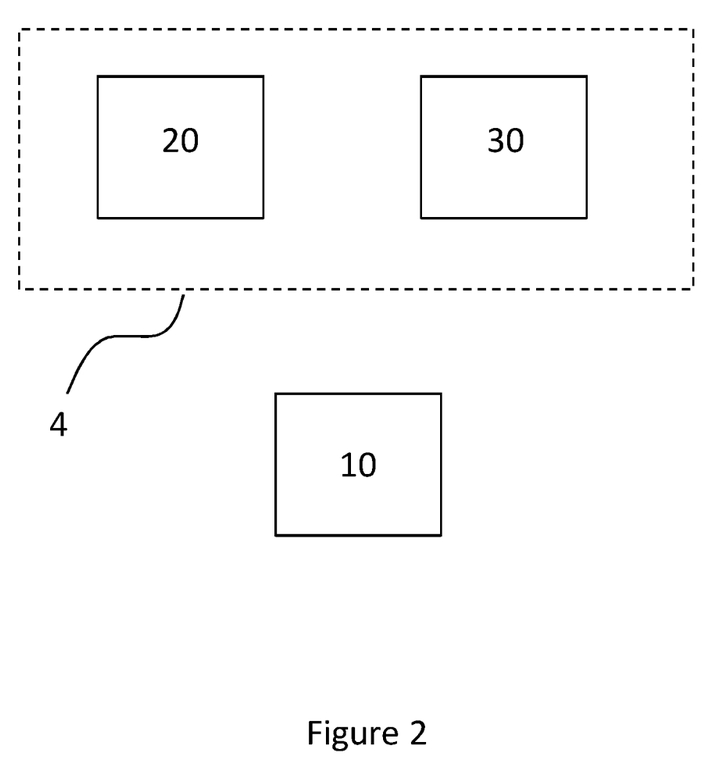
FIG. 2 shows a print system according to an embodiment of the invention.

FIG. 2 shows a print system according to an embodiment of the invention. The print system comprises a hardware client 20, a management server 10 and a print apparatus 30.

The print apparatus 30 is an apparatus capable of outputting a print job and is preferably a multi-function peripheral (MFP) capable of printing, scanning and copying. The MFP may be provided with a software platform that enables individual applications to be installed and run on the MFP but this is not essential. An example of such a software platform is MEAP, a java based application software platform provided on some Canon MFPs that allows installation and running of applications on the MFP.

The hardware client 20 is a conventional computer e.g. a personal computer in the form of a desktop computer, laptop computer, tablet computer, notebook etc.

The client, management server and print apparatus are connected by a network. For example the client and print apparatus may be connected via a WAN or LAN 4 and the client and print apparatus may connect to the management server via the internet. As another example the client, management server and print apparatus may all be connected by a LAN or WAN. The client, management server and print apparatus are preferably HTTPS enabled. The data exchanged may be, for example, XML or JSON format.

Figure 3:
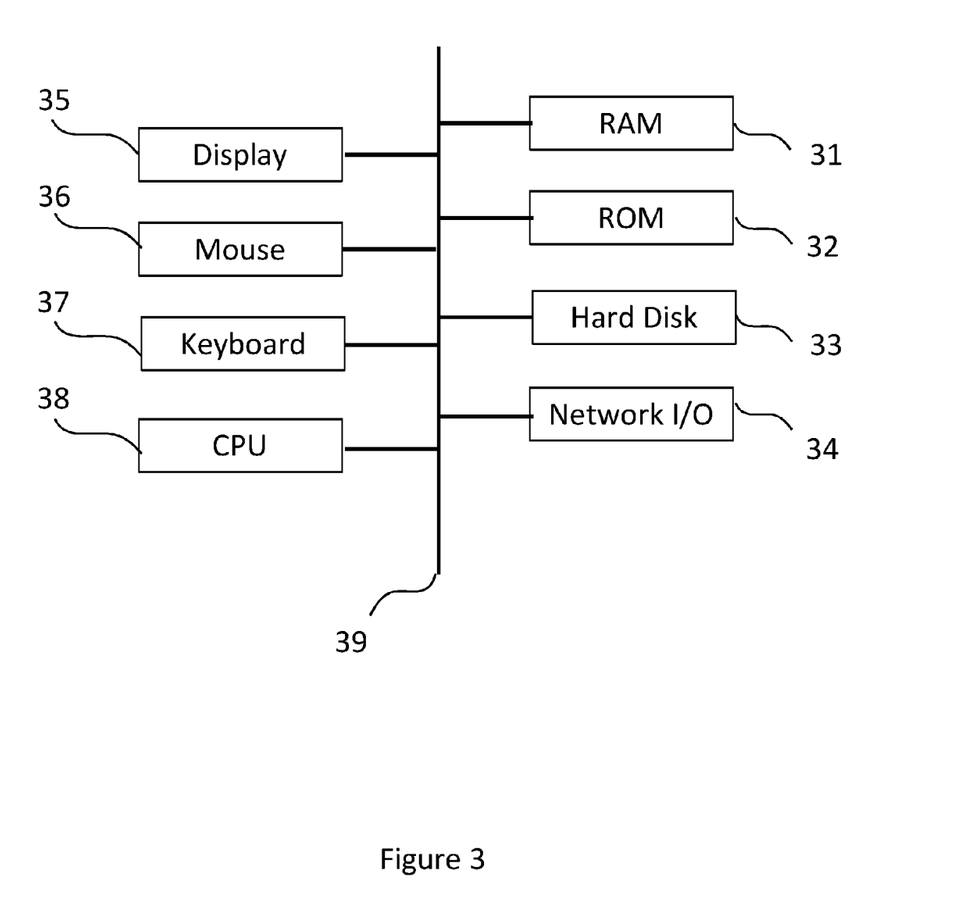
FIG. 3 shows a schematic representation of some of the components of the client.

FIG. 3 schematically shows the layout of some components of the hardware client 20. The client comprises RAM 31, ROM 32, a hard disk 33, a network communication module 34, a display 35, a mouse 36, a keyboard 37, and a CPU 38. The components can communicate with each other over bus 39.

Figure 4:
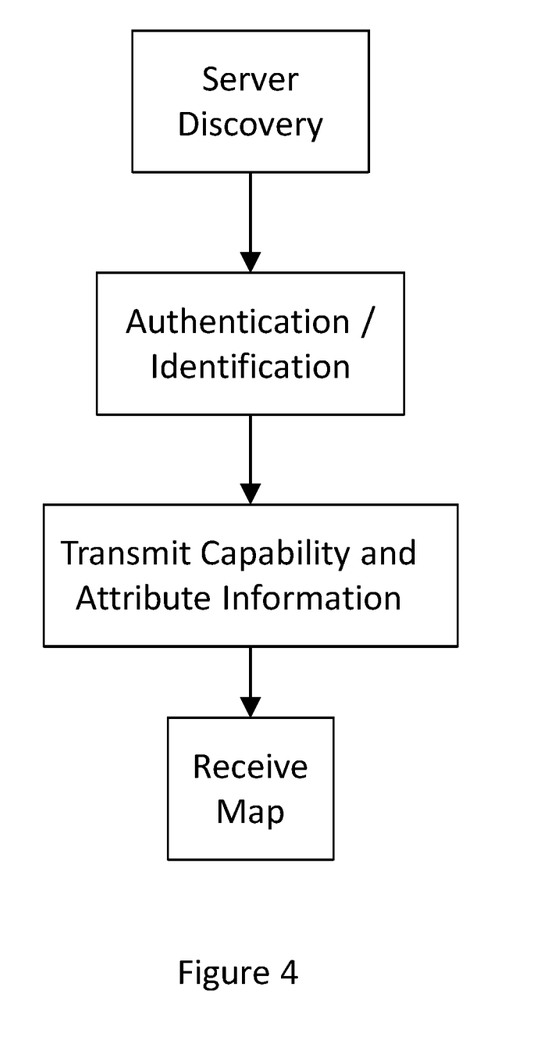
FIG. 4 shows the process performed by the client.

The RAM 31 is provided as a storage area for data being processed by the CPU 38. The ROM 32 stores programs, such as the BIOS (Basic Input/Output System) of the client. The hard disk 33 provides a storage area for programs and other data on the client. The network communication module 34 represents software and hardware provided on the client to allow the client to communicate over a network such as a LAN or the internet. A plurality of network communication modules may be present, each allowing the client to communicate over a different network. The display 35, keyboard 37 and mouse 36 are standard components provided to allow a user to interact with and operate software on the client 20. The CPU 38 is a standard processor, such as those manufactured by Intel® or AMD®. Software that when run causes the client 20 to perform the operations described in connection with FIG. 4 is stored in the hard disk 33. The software may be run using the CPU 38 and RAM 31 in a conventional manner. In this way, the stored software may control the client to perform operations described in connection with FIG. 4.

Figure 5:
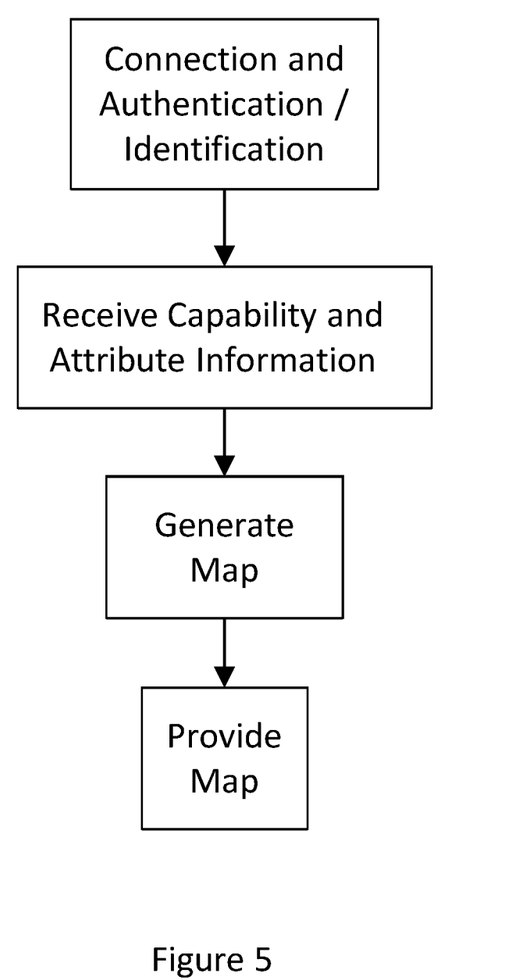
FIG. 5 shows the process performed by the management server.

The management server 30 comprises similar components to those shown in FIG. 3, the description thereof will therefore not be repeated. Software that when run causes the management server to carry out the operations described in connection with FIG. 5 is stored in a hard disk and the software may be run in a conventional manner using the CPU and RAM. In this way, the stored software may control the management server to perform the operations described in connection with FIG. 5.

FIG. 4 shows the processing performed by the client. Upon running the client software the client 20 performs a server discovery process 40 to connect to the management server using HTTPS. The server discovery process may be achieved by:

(i) connecting to the management server using a pre-configured URL for the management server;
(ii) executing a DNS (Domain Name System) query for the client's default domain;
(iii) executing a DHCP (Dynamic Host Configuration Protocol) discovery to determine if a DHCP option is present thereby determining determine the URL of the management server via which connection is established; or
(iv) issuing an IP V6 Multicast request to a predetermined multi cast address, to which the listening management server will respond such that connection can be established.

The above options may be executed in the order given above, thus the option (i) will take precedence over the following option (ii) etc.

It is possible that more than one management server is discovered using the above mechanisms. Preferably each management server will carry a "preference" attribute e.g. in the form of an integer. The client will favour 'higher' preference numbers to connect to. The preference attribute thus enables fail-over and load balancing in the print system.

The client authenticates itself with the management server via e.g. an SAML (Security Assertion Markup Language) token which is signed by a trusted provider or which may be a self-signed token. In another alternative HTTP Basic Authentication via HTTPS may be used.

Once connection to the management server has been established, the client is configured to send a registration request comprising attribute information and capability information to the management server 42.

The attribute information from the client comprises one or more types of attribute information from the group consisting of the IP address, hostname, domain name and logged on users name. The IP address, hostname and domain name indicate the location of the client.

The management server stores a set of predefined "configuration groups" wherein for each configuration group at least one device is identified, e.g. by a URL, for each of a plurality of print process services. The management server also stores a predefined set of rules, based on at least one type of attribute information mentioned above, used to identify which configuration group the client belongs to. The management server applies the predefined rules to the received attribute information from the client to associate the client to a "configuration group". The rules may either directly refer to the attribute information received from the client or may refer to attributes that can be derived from the attribute information received. The management server may use a particular aspect of the sent attribute information, e.g. logged on users name, to identify a stored user object corresponding to the logged on users name, wherein the stored user object has an assigned property such as a "Group association" which identifies a configuration group. So the server may have a predefined rule specifying that users with default group xyz belong to that configuration group. This "default group" is something the Management Server knows by loading the user object with the user login name. Besides groups a user (object) entity in the management server may have many more attributes, e.g. cost center(s), addresses etc. any of these can be used in the predefined rules to find the correct "configuration group" association.

The capability information of the client indicates which of the services forming part of the secure print process the client can perform.

An explanation of exemplary services forming part of the secure print process will now be given.

Considering the known secure print process described earlier, this print process involves various services as set out in (a) to (d) below:

(a) an identification service to identify a user based on, for example, a card number or user name and password combination. The identification may be performed e.g. by a direct link to an Active Directory or by a known custom identification service.
(b) A spool storage service storing spool files for print jobs. Several spooling services may exist which are capable of distributing or mirroring spool jobs. In addition to job data, information indicating the processing state of the job may also be stored.
(c) A job processing service such as a workflow engine for processing a job in accordance with a workflow.
(d) A job information service storing information about jobs that are being processed, including their processing state. When, for example, the job processing service determines that a job is to be queued for releasing, the job information service receives registration of the job from the job processing service together with a URI identifying the spool service where the spool file of the job is stored.

In addition one or more of the following services may also form part of the print process:

(e) A logging service which receives log information from networked devices for e.g. diagnostic purposes.
(f) A statistic service which receives statistical information from networked devices and/or consolidates incoming data.
(g) A notification service that can display notifications e.g. on the client(s).
(h) A device control service for device(s), e.g. a non-MEAP printer, that requires control.

The capability information indicates which of the services the client can provide and is transmitted to the management server with, in addition, an indication of the URL of the client.

An example of attribute and capability information transmitted by the client to the management server is shown below (where "xyz" is the URL the client provides the declared service by):

```
<peer type="Windows SmartClient" id="[GUID]"
entryurl="rest/1.0">
<parameter name="user">auser</parameter>
<parameter name="IP">1.2.3.4</parameter>
<parameter name="DOMAIN">local</parameter>
<parameter name="HOST">computer</parameter>
. . .
</peer>
<service type="JobInformationService">
<endpoint url="xyz">
```

-continued

```
        <parameter name="user">auser</parameter>
    </endpoint>
</service>
```

Here the client is providing four types of attribute information namely IP address (1.2.3.4), hostname (computer), domain name (local) and logged on users name (auser).

Here the client is also indicating that it is capable of providing job information for the user (auser), so is capable of performing the job information service for that particular user. Other services, not shown above, the client can perform, e.g. spool storage can also be indicated as a "service type".

The client is also configured to issue a request to the management server to get 43 a map indicating for e.g. each of the services (a) to (d) indicated above, address information of at least one networked device capable of performing the service.

The map for the three above-mentioned services thus comprises for each service, an address, preferably a URL, of at least one networked device capable of performing the service, with an attribute indicating whether the service can be performed either partially or completely. So a map may comprise, for example:

```
<service type="JobInformationService">
    <endpoint url="xyz">
        <parameter name="type">partial</parameter>
        <parameter name="user">auser</parameter>
    </endpoint>
    <endpoint url="...">
        <parameter name="type">partial</parameter>
    </endpoint>
</service>
<service type="...">
    ...
</service>
...
```

The map above, for example, when received by the client 43 in response to its query, indicates to the client that the networked device with address xyz can provide the service of storing the job information on pending jobs, e.g. as a joblist. The client is thus informed it needs to send job information to the device with the URL "xyz", which stores a list of pending jobs for a user, as part of a secure print process or, if the address "xyz" represents the client itself, as in the present case, then the client will itself store a list of pending jobs for the user logged on to the client.

The map also indicates that the networked device xyz has the attribute "partial" for the job information service so that any device requesting job information from the device with address xyz knows that it also has to get job information from the other addressed device indicated as "partial" (so URL " . . . " above). If the networked device "xyz" had the attribute "complete" in the map above then a device requesting job information is informed that it would only need to ask device xyz for job information, so would not need to issue any further request for job information after it got back a successful response from the device with address xyz.

Similarly for other service types such as the job processing service and the job storage service (not shown explicitly above), the map indicates which networked device(s) can provide the service, by indicating the address of the device, and also whether it can provide the service partially or completely.

Taking the example of the Spool Storage Service, the map may indicate two addresses "abc" and "def" as networked devices capable of performing the spool storage service. If both these addresses have the "complete" attribute the spoolfile only needs to be successfully sent to one of the devices. If the attribute was "partial" for both devices the spoolfile would need to be sent to both devices.

The complete/partial attribute thus has the advantage of providing failover or distributed services/data capability.

The service parameter indicated in addition to the partial/complete indication, so the parameter with the name "user" in the map above has the advantage of avoiding unnecessary lookups. So, for example, a client that stores the job information itself most likely only has job information for the user currently logged on to the client. The additional parameter(s) for each service give an indication, to a requesting device wishing to use such a service, whether a request is worth sending to such an addressed device or not. For example if a UserA is logged on to a printer and the printer needs to query the job information service to display jobs for UserA the user parameter can be used to determine which addressed devices providing job information services should be queried for job information relating to userA. So a job information service that only indicates userB as a user need not be queried because it cannot deliver any information for the current context (userA).

The operation of the management server in accordance with the embodiment of the invention will now be described with reference to FIG. 5.

The management server establishes connection with the client e.g. using HTTPS. The management server authenticates the client 50 using e.g. the SAML token provided by the client.

The management server receives 51 the attribute information, so one or more of IP address, hostname, domain name and logged on users name, and capability information 51 from the client. The management server generates 52 an endpoint map, indicating for each of a plurality of services forming part of a print process, address information of at least one networked device capable of performing the service, based on the attribute and capability information from the client.

In particular the management server analyses the received attribute information and may, as described above, apply a stored predefined set of rules to the attribute information to determine which of a stored set of predefined "configuration groups", or templates, the client belongs to. For each stored configuration group the address of at least one device is specified for each of the plurality of services forming part of the print process (e.g. (a) to (d) above). Alternatively, rather than applying a set of predefined rules, the management server may use a particular aspect of the sent attribute information, e.g. logged on users name, to identify a pre-stored user object corresponding to the logged on users name, wherein the stored user object has an assigned a property such as a "Group association" which identifies a configuration group.

For each "configuration group" a list of addresses is specified for each of the plurality of services provided. These addresses may either be absolute URLs e.g:

Identification=https://aserver/rest/1.0/services/identification,https://anotherserver/rest/1.0/services/identification or may be a mixture of sub-templates, like <SMARTCLIENT>, and absolute URLs as shown below:
 JobInformation=<SMARTCLIENT>,https://aserver/rest/1.0/services/jobinformation.

Upon client registration, so upon receipt of the attribute and capability information from the client, the management server will check which configuration group the client belongs to as described above. Everywhere where the sub-template <SMARTCLIENT> is given at configuration time, the client's endpoint URL for that service will be inserted at runtime providing the capability information of the client indicates it can perform the service), thereby dynamically generating the endpoint map. The capability information is preferably cached on the management server such that it does not forget about a registered client directly after it has been registered.

The complete and partial attributes are set for services at configuration time depending on whether a distribution of services or a failover is required.

The management server then transmits the map to the client 53 and preferably also to the printer.

The print apparatus also comprises similar components to those shown in FIG. 3, in addition to conventional image forming components. Software that when run causes the print apparatus to register itself with the management server, and where relevant to transmit capability information, so information indicating which of the services forming part of the print process the print apparatus can provide, to the management server may be stored in a hard disk. The software may be run in a conventional manner using the CPU and RAM. In this manner the print apparatus may also transmit its capability information, e.g. if it is configured to provide a spool storage service, to the management server and the management server is configured to include this capability information in the map provided to the printer and client. In the configuration group there may be a <MEAP> sub-template into which the registered printer's endpoint URL will be inserted at runtime as the Printer can also offer services, e.g. Spool Storage (similarly to the <SMARTCLIENT> sub-template as explained above).

The printer is also configured to use the map in the performance of the print process.

A specific example of the print process will now be described. In this case the generated map indicates that the client is capable of performing the job processing service, spool storage service and job information service whilst the management server is capable of performing the identification service. With reference to FIG. 2, the printer 30 and client 20 are connected via a LAN but require an internet connection to connect to the management server 10. If a user prints a job on the client 20 the client controls the performance of the print job such that it is performed in accordance with a workflow (job processing service), stores the spool file (spool storage service) and the job information (job information service) in accordance with the map. When the user logs on at the printer 30, the printer contacts the management server to perform the identification check (identification service) as indicated in the map. Upon identification of the user, the printer gets the list of pending jobs from the client 20 and upon selection of the required print job(s) by the user at the printer 30, the spool file is obtained directly from the client 20. The print process can thus be performed without requiring transmission of the spool file to and from the management server 10 thereby reducing network traffic and increasing reliability.

Figure 6:
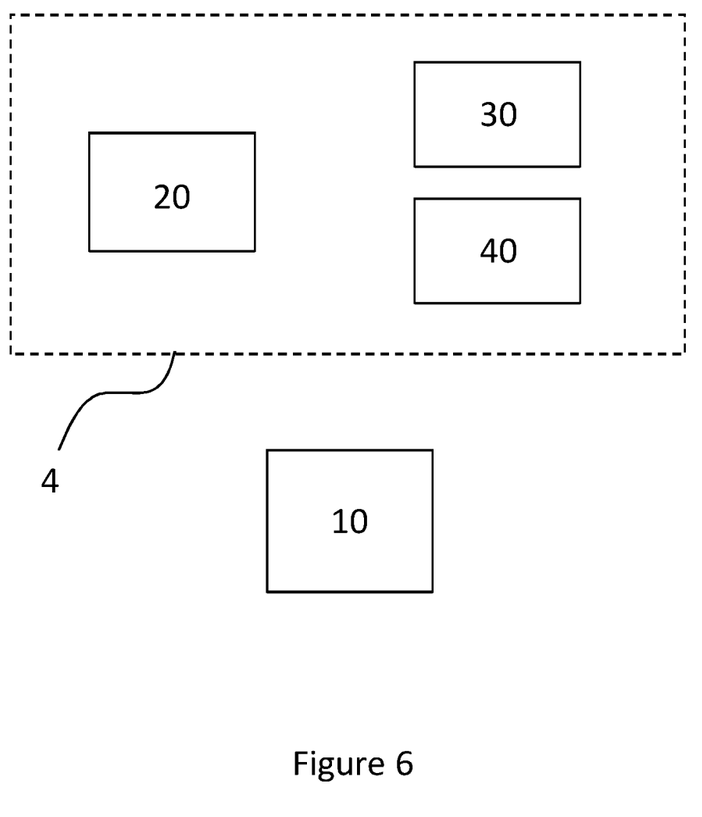
FIG. 6 shows another print system in accordance with the invention.

Another example will now be explained with reference to FIG. 6 in which the reference numbers correspond to those of FIG. 2 and with the addition of another print apparatus 40. The map has already been provided by the management server 10 to the devices 20, 30 and 40. The map indicates that the client is capable of performing the job processing service and job information service whilst the print apparatus 30 is capable of performing the identification service and the print apparatus 40 is capable of performing the spool storage service.

If a user prints a job on the client 20 the client controls the performance of the print job such that it is performed in accordance with a workflow (job processing service) and stores the job information (job information service) in accordance with the map. The spool file is sent to the print apparatus 40 in accordance with the map (spool storage service). When the user logs on at the printer 30, the printer performs the identification check (identification service) as indicated in the map. Upon identification of the user, the printer 30 gets the list of pending jobs from the client 20 and upon selection of the required print job(s) by the user at the printer 30, the spool file is obtained from the print apparatus 40 via the client 20.

The present invention also provides:
 a computer program which on execution by a print system, the print system being made up of networked devices, the networked devices comprising a management server, a client and a printer, causes the print system to execute the method of claim 14;
 a computer program which on execution by a management server, for use in a print system made up of networked devices, the networked devices including a client and a printer, causes the management server to execute the method of claim 15;
 a computer program which on execution by a client, the client being for use in a print system made up of networked devices, the networked devices including a management server and a printer, causes the client to execute the method of claim 16.

The invention also provides a computer-readable storage medium storing one or more of the computer programs listed above.

The invention claimed is:

1. A print system made up of networked devices, the print system comprising:
 a management server as a networked device;
 a client as a networked device; and
 a printer as a networked device,
 wherein the client is configured to provide, to the management server:
 attribute information, indicating at least a location of the client, and
 capability information, indicating a capability of the client to perform one or more of a plurality of services forming part of a print process, wherein the plurality of services forming part of a print process includes two or more of an identification service, a spool storage service, a job processing service, and a job information service, wherein the management server is configured to use the attribute information and capability information provided by the client to generate a map indicating, for each of the plurality of services forming part of the print process, address information of at least one networked device capable of performing the service,
 wherein the management server is configured to provide the generated map to the client, and
 wherein the client is configured to use the address information of the map in the performance of the print process.

2. The print system according to claim 1, wherein the client is configured to use the address information of the map to request, for at least one of the plurality of services, one of the other networked devices to perform the service or to perform the service itself.

3. The print system according to claim 1, wherein the management server is configured to dynamically generate the map.

4. The print system according to claim 3, wherein the management server is configured to dynamically generate the map by selecting a template, from a plurality of pre-stored templates, for the map based on the attribute information provided by the client and to adjust the selected template based on the capability information provided by the client.

5. The print system according to claim 1, wherein the address information includes a parameter indicating whether the addressed at least one networked device can independently perform the complete service or whether the addressed at least one networked device can only partially perform the service.

6. The print system according to claim 1, wherein the management server is connectable via the internet to at least the client apparatus.

7. The print system according to claim 1,
wherein the printer is configured to provide capability information, indicating the capability of the printer to perform at least one of the plurality of services forming part of the print process, to the management server, and
wherein the management server is configured to use the capability information from the printer to generate the map.

8. The print system according to claim 1,
wherein the management server is configured to provide the generated map to the printer, and
wherein the printer and the client are configured to use the address information of the map to request, for each of the plurality of services, one of the other networked devices to perform the service or to perform the service themselves.

9. A management server for use in a print system made up of networked devices that include a client and a printer, the management server comprising:
an interface configured to receive, from the client, attribute information, indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service; and
a processor configured to use the attribute information and capability information provided by the client to generate a map indicating, for each of the plurality of services forming part of the print process, address information of at least one networked device capable of performing the service,
wherein the interface further is configured to provide the generated map to the client for use in the performance of the print process.

10. A client for use in a print system made up of networked devices that include a management server and a printer, the client comprising:
an interface configured to provide, to the management server, attribute information indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service,
wherein the interface further is configured to receive a map indicating, for each of the plurality of services forming part of the print process, address information of at least one networked device capable of performing the service, from the management server; and
a processor configured to use the address information of the map in the performance of the print process.

11. A method for a print system made up of networked devices including management server as a networked device, a client as a networked device, and a printer as a networked device, the method comprising:
providing, from the client to the management server, attribute information, indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;
using, via the management server, the attribute information and capability information provided by the client to generate a map indicating, for each of the plurality of services forming part of the print process, address information of at least one networked device capable of performing the service;
providing, from the management server to the client, the generated map; and
using, via the client, the address information of the map in the performance of the print process.

12. A method for a management server for use in a print system made up of networked devices that include a client and a printer, the method comprising:
receiving, via an interface of the management server from the client, attribute information, indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;
using, via a processor, the attribute information and capability information provided by the client to generate a map indicating, for each of the plurality of services forming part of the print process, address information of at least one networked device capable of performing the service; and
providing, via the interface, the generated map to the client for use in the performance of the print process.

13. A method for a client for use in a print system made up of networked devices that include a management server and a printer, the method comprising:
providing, to the management server via an interface, attribute information indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;

receiving, via the interface, a map indicating, for each of the plurality of services forming part of the print process, address information of at least one networked device capable of performing the service, from the management server; and using, via a processor, the address information of the map in the performance of the print process.

14. A non-transitory storage medium storing a program which, on execution by a print system made up of networked devices including management server as a networked device, a client as a networked device, and a printer as a networked device, causes the print system to perform a method comprising:

providing, from the client to the management server, attribute information, indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;

using, via the management server, the attribute information and capability information provided by the client to generate a map indicating, for each of the plurality of services forming part of the print process, address information of at least one networked device capable of performing the service;

providing, from the management server to the client, the generated map; and using, via the client, the address information of the map in the performance of the print process.

15. A non-transitory storage medium storing a program which, on execution by a management server for use in a print system made up of networked devices that include a client and a printer, causes the management server to perform a method comprising:

receiving, via an interface from the client, attribute information, indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;

using, via a processor, the attribute information and capability information provided by the client to generate a map indicating, for each of the plurality of services forming part of the print process, address information of at least one networked device capable of performing the service; and providing, via the interface, the generated map to the client for use in the performance of the print process.

16. A non-transitory storage medium storing a program which, on execution by a client for use in a print system made up of networked devices that include a management server and a printer, cause the client to perform a method comprising:

providing, to the management server via an interface, attribute information indicating at least a location of the client, and capability information, indicating a capability of the client to perform one or more of a plurality of services forming part of a print process, wherein the plurality of services forming part of a print process includes two or more of an identification service, a spool storage service, a job processing service, and a job information service;

receiving, via the interface, a map indicating, for each of the plurality of services forming part of the print process, address information of at least one networked device capable of performing the service, from the management server; and using, via a processor, the address information of the map in the performance of the print process.

* * * * *